United States Patent
Yao et al.

(10) Patent No.: US 7,468,869 B2
(45) Date of Patent: Dec. 23, 2008

(54) MICRO-ACTUATOR, MICRO-ACTUATOR SUSPENSION, AND HEAD GIMBAL ASSEMBLY WITH THE SAME

(75) Inventors: MingGao Yao, DongGuan (CN); Masashi Shiraishi, HongKong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 351 days.

(21) Appl. No.: 11/414,546

(22) Filed: May 1, 2006

(65) Prior Publication Data

US 2007/0253115 A1  Nov. 1, 2007

(51) Int. Cl.
*G11B 5/56* (2006.01)

(52) U.S. Cl. .................................. 360/294.4
(58) Field of Classification Search ............... 360/294.4
See application file for complete search history.

(56) References Cited

U.S. PATENT DOCUMENTS

| | | | |
|---|---|---|---|
| 5,299,081 | A | 3/1994 | Hatch et al. |
| 5,611,707 | A | 3/1997 | Meynier |
| 5,636,089 | A | 6/1997 | Jurgenson et al. |
| 5,898,544 | A | 4/1999 | Krinke et al. |
| 6,198,606 | B1 | 3/2001 | Boutaghou et al. |
| 6,538,836 | B1 | 3/2003 | Dunfield et al. |
| 6,617,763 | B2 | 9/2003 | Mita et al. |
| 6,624,984 | B2 | 9/2003 | Lewis et al. |
| 6,671,131 | B2 | 12/2003 | Kasajima et al. |
| 6,700,727 | B1 | 3/2004 | Crane et al. |
| 6,700,749 | B2 | 3/2004 | Shiraishi et al. |
| 6,950,266 | B1 | 9/2005 | McCaslin et al. |
| 2003/0147177 | A1 | 8/2003 | Yao et al. |
| 2003/0147181 | A1 | 8/2003 | Shiraishi et al. |
| 2003/0168935 | A1 | 9/2003 | Ogawa et al. |
| 2006/0023338 | A1 | 2/2006 | Sharma et al. |
| 2006/0050442 | A1* | 3/2006 | Yao et al. .................. 360/294.4 |
| 2006/0072247 | A1 | 4/2006 | Yao et al. |
| 2006/0082917 | A1 | 4/2006 | Yao et al. |
| 2006/0098347 | A1* | 5/2006 | Yao et al. .................. 360/294.4 |

(Continued)

FOREIGN PATENT DOCUMENTS

JP     2002-74871     3/2002

(Continued)

OTHER PUBLICATIONS

U.S. Appl. No. 11/238,998, filed Sep. 2005, Yang et al.

(Continued)

*Primary Examiner*—Tianjie Chen
(74) *Attorney, Agent, or Firm*—Nixon & Vanderhye P.C.

(57) ABSTRACT

A micro-actuator for a head gimbal assembly includes a support frame integrated with a suspension flexure of the head gimbal assembly, a block, and a pair of PZT elements. The support frame includes a bottom support, a top support adapted to support a slider of the head gimbal assembly, and a pair of side arms that interconnect the bottom support and the top support. The side arms extend vertically from respective sides of the bottom support and the top support. The block is mounted to the bottom support to provide resonance balance. Each PZT element is mounted to a respective side arm of the support frame and a respective side of the block. The PZT elements are excitable to cause selective movement of the side arms.

20 Claims, 17 Drawing Sheets

U.S. PATENT DOCUMENTS

2006/0146449 A1* 7/2006 Yao et al. .................. 360/294.4
2007/0223145 A1* 9/2007 Yao .......................... 360/294.4
2007/0223146 A1* 9/2007 Yao et al. .................. 360/294.4

FOREIGN PATENT DOCUMENTS

JP 2002-133803 5/2002

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/440,354, filed May 2006, Li.

* cited by examiner

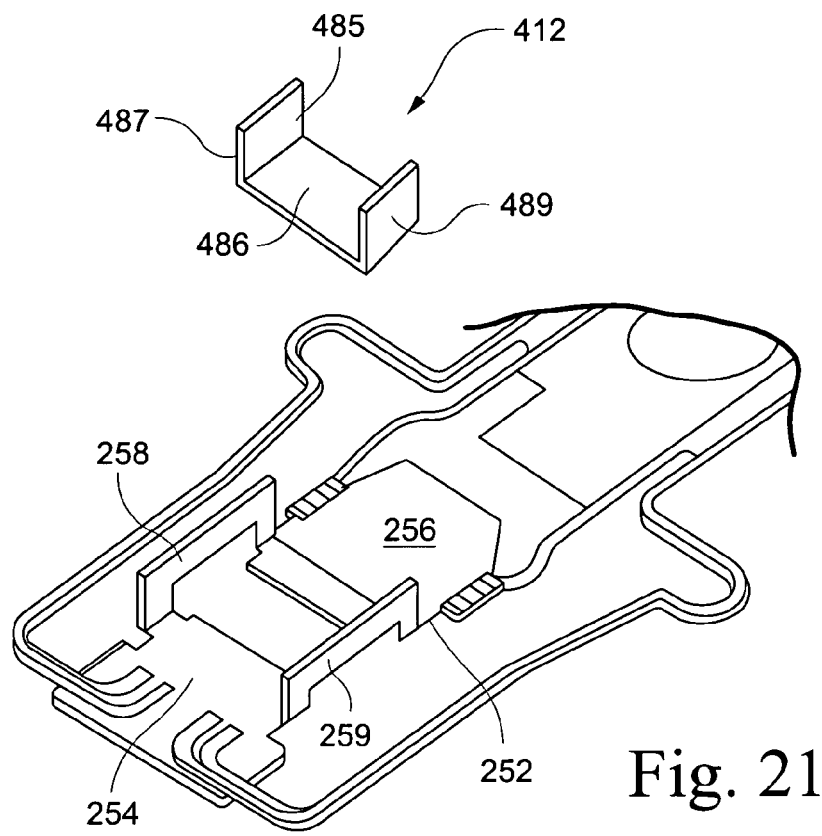
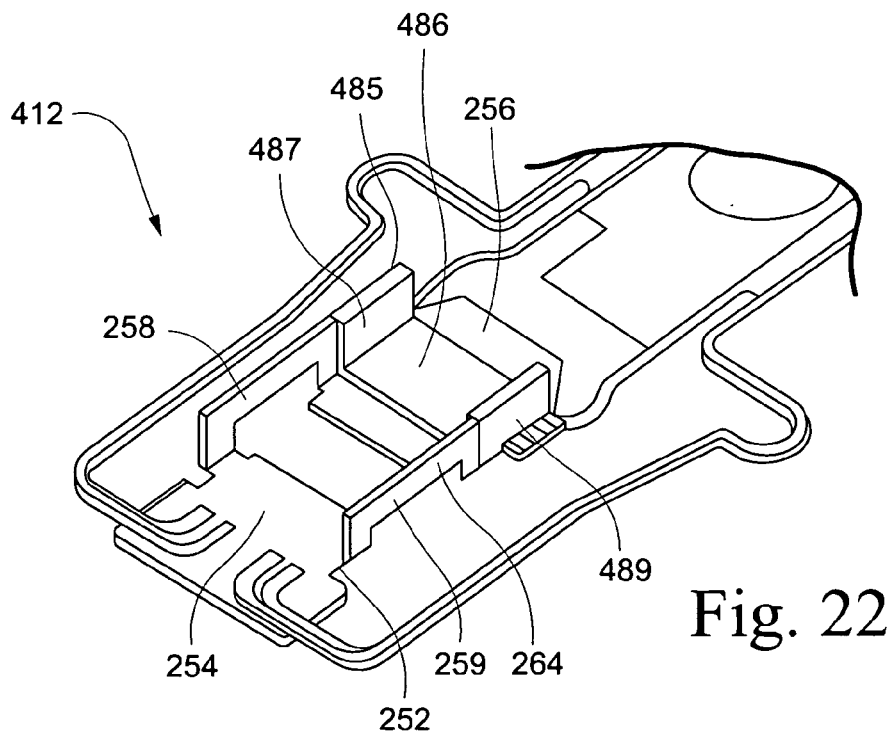

MICRO-ACTUATOR, MICRO-ACTUATOR SUSPENSION, AND HEAD GIMBAL ASSEMBLY WITH THE SAME

FIELD OF THE INVENTION

The present invention relates to information recording disk drive devices and, more particularly, to a micro-actuator, micro-actuator suspension, and head gimbal assembly (HGA) or head stack assembly for the disk drive device.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871, entitled "Head Gimbal Assembly Equipped with Actuator for Fine Position, Disk Drive Equipped with Head Gimbals Assembly, and Manufacture Method for Head Gimbal Assembly."

FIGS. 1 and 2 illustrate a conventional disk drive unit and show a magnetic disk 101 mounted on a spindle motor 102 for spinning the disk 101. A voice coil motor arm 104 carries a head gimbal assembly (HGA) 100 that includes a micro-actuator 105 with a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101.

Because of the inherent tolerances (dynamic play) of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the resonance tolerance of the VCM and/or head suspension assembly. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator 105 enables the disk drive device to have a significant increase in the surface recording density of the information storage disks used therein.

FIG. 3 illustrates a micro-actuator as known in the prior art, e.g., see U.S. Pat. No. 6,198,606. A slider 112 (containing a read/write head) is utilized for maintaining a prescribed flying height above the surface of a magnetic disk. A micro-actuator may have flexible beams 114 to connect a support device 116 to a slider containment unit 118. This arrangement enables the slider 112 to move independent of the motor arm. An electromagnetic assembly or an electromagnetic/ferromagnetic assembly may be utilized to provide minute adjustment in orientation of the slider 112 with respect to the motor arm.

The arrangement illustrated in FIG. 3 has several drawbacks. First, manufacture of the electromagnetic assembly or electromagnetic/ferromagnetic assembly is difficult since the micro-actuator is too small with its location on the head suspension. Also, the mass may effect the head gimbal assembly performance, e.g., the resonance. Second, the flexible beams 114 are difficult to manufacture and the stiffness may strongly effect micro-actuator performance, e.g., displacement and shock performance. Also, the flexible beams 114 may have particle generation and aging concern if work conditions change, e.g., temperature and humidity changes. Third, assembly of the flexible beams and the electromagnetic assembly or electromagnetic/ferromagnetic assembly is a complete process and not easy control in the process. This causes the manufacturing cost to be higher and the process variation to be larger.

Thus, there is a need for an improved system that does not suffer from the above-mentioned drawbacks.

SUMMARY OF THE INVENTION

One aspect of the present invention relates to a micro-actuator for a head gimbal assembly. The micro-actuator includes a support frame integrated with a suspension flexure of the head gimbal assembly, a block, and a pair of PZT elements. The support frame includes a bottom support, a top support adapted to support a slider of the head gimbal assembly, and a pair of side arms that interconnect the bottom support and the top support. The side arms extend vertically from respective sides of the bottom support and the top support. The block is mounted to the bottom support to provide resonance balance. Each PZT element is mounted to a respective side arm of the support frame and a respective side of the block. The PZT elements are excitable to cause selective movement of the side arms.

Another aspect of the present invention relates to a head gimbal assembly including a micro-actuator, a slider, and a suspension that supports the micro-actuator and the slider. The micro-actuator includes a support frame integrated with a suspension flexure of the suspension, a block, and a pair of PZT elements. The support frame includes a bottom support, a top support to support the slider, and a pair of side arms that interconnect the bottom support and the top support. The side arms extend vertically from respective sides of the bottom support and the top support. The block is mounted to the bottom support to provide resonance balance. Each PZT element is mounted to a respective side arm of the support frame and a respective side of the block. The PZT elements are excitable to cause selective movement of the side arms.

Another aspect of the present invention relates to a disk drive device including a head gimbal assembly, a drive arm connected to the head gimbal assembly, a disk, and a spindle motor operable to spin the disk. The head gimbal assembly includes a micro-actuator, a slider, and a suspension that supports the micro-actuator and slider. The micro-actuator includes a support frame integrated with a suspension flexure of the suspension, a block, and a pair of PZT elements. The support frame includes a bottom support, a top support to support the slider, and a pair of side arms that interconnect the bottom support and the top support. The side arms extend vertically from respective sides of the bottom support and the top support. The block is mounted to the bottom support to provide resonance balance. Each PZT element is mounted to a respective side arm of the support frame and a respective side of the block. The PZT elements are excitable to cause selective movement of the side arms.

Yet another aspect of the present invention relates to a method for manufacturing a PZT micro-actuator. The method includes integrating a micro-actuator support frame with a suspension flexure of a suspension, attaching a resonance balance block to a bottom support of the micro-actuator support frame, attaching PZT elements to the micro-actuator support frame such that each PZT element extends along a respective side arm of the micro-actuator support frame and a respective side of the resonance balance block, mounting a slider to a top support of the micro-actuator support frame, electrically bonding the PZT elements and the slider with suspension traces of the suspension, and performing a visual check.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIGS. 21-22 are perspective views of a PZT micro-actuator according to another embodiment of the present invention.

DETAILED DESCRIPTION OF ILLUSTRATED EMBODIMENTS

Figure 1:
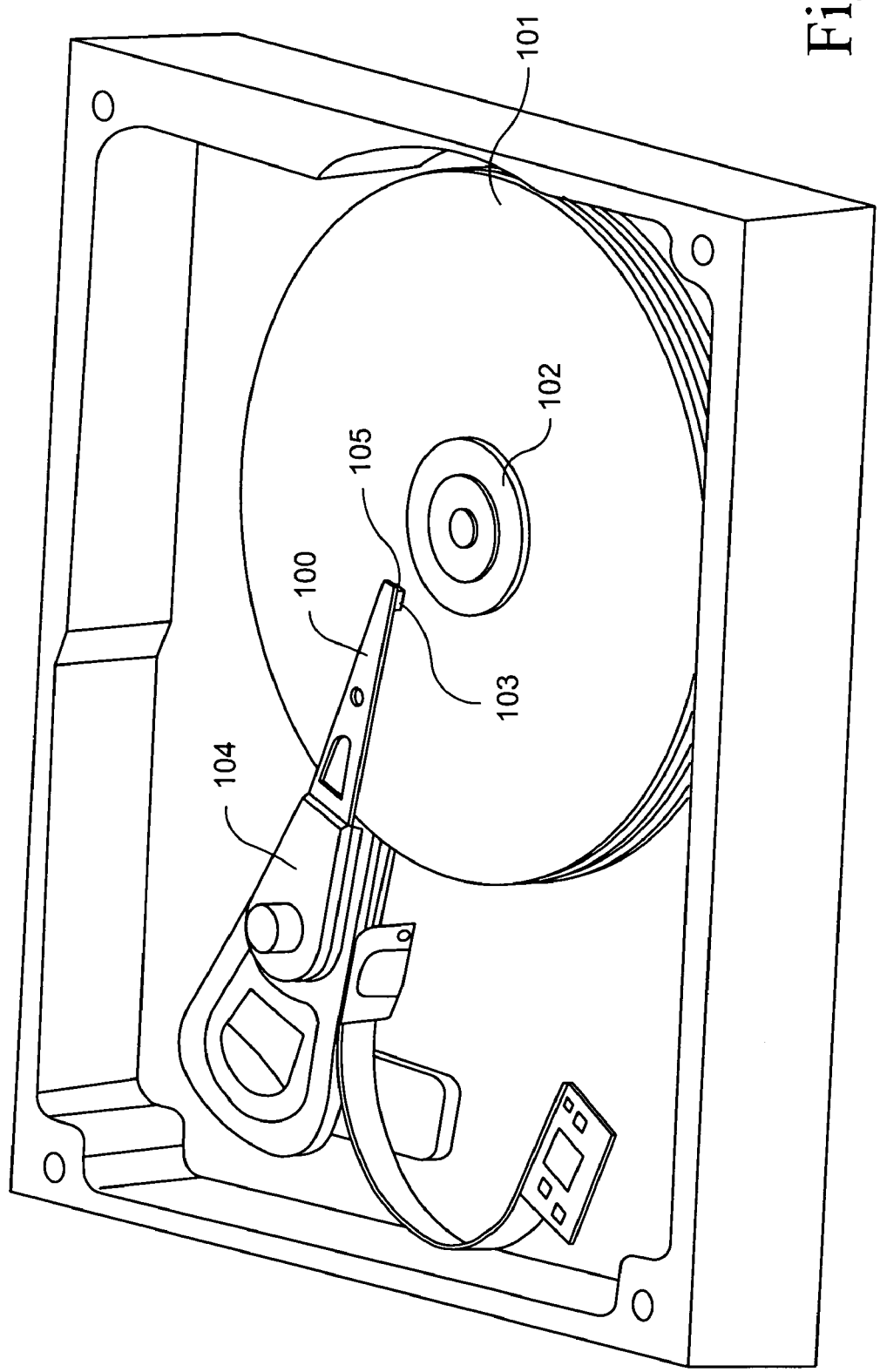
FIG. 1 is a perspective view of a conventional disk drive unit.

Various embodiments of the present invention will now be described with reference to the figures, wherein like reference numerals designate similar parts throughout the various views. The present invention is designed to improve resonance performance in a head gimbal assembly (HGA) while precisely actuating the slider using the micro-actuator. By improving resonance performance of the HGA, the performance characteristics of the device are improved.

Several example embodiments of a HGA will now be described. It is noted that the micro-actuator may be implemented in any suitable disk drive device having a micro-actuator in which it is desired to improve resonance performance, regardless of the specific structure of the HGA as illustrated in the figures. That is, the invention may be used in any suitable device having a micro-actuator in any industry.

FIGS. 4-17c illustrate a head gimbal assembly (HGA) 210 including a PZT micro-actuator 212 according to an embodiment of the present invention. The HGA 210 includes a PZT micro-actuator 212, a slider 214, and a suspension 216 to load or suspend the PZT micro-actuator 212 and the slider 214.

As best shown in FIGS. 4-9, the suspension 216 includes a base plate 218, a load beam 220, a hinge 222, a flexure 224, and inner and outer suspension traces 226, 227 on the flexure 224. The hinge 222 is mounted onto the base plate 218 and load beam 20, e.g., by laser welding. A hole 228 is provided in both the base plate 218 and the hinge 222 for use in connecting the suspension 216 to a drive arm of a voice coil motor (VCM) of a disk drive device. The base plate 218 is constructed of a relatively hard or rigid material, e.g., metal, to stably support the suspension 216 on the drive arm of the VCM. Another hole 230 is provided in both the base plate 218 and the hinge 222 for reducing weight. Also, the hinge 222 includes a holder bar 232 for supporting the load beam 220.

The load beam 220 is mounted onto the holder bar 232 of the hinge 222, e.g., by welding. The load beam 220 has a dimple 234 formed thereon for engaging a suspension tongue 238 (see FIG. 7). An optional lift tab 236 may be provided on the load beam 220 to lift the HGA 210 from the disk when the disk is not rotated.

The flexure 224 is mounted to the hinge 222 and the load beam 220, e.g., by laser welding. The suspension tongue 238 is mounted to the flexure 224, e.g., by mechanical welding. The suspension tongue 238 couples the PZT micro-actuator 212 to the suspension 216 (see FIG. 7). Also, the suspension traces 226, 227 are provided on the flexure 224 to electrically connect a plurality of connection pads 240 (which connect to an external control system) with the slider 214 and the PZT elements 242, 243 on the PZT micro-actuator 212.

Figure 10:
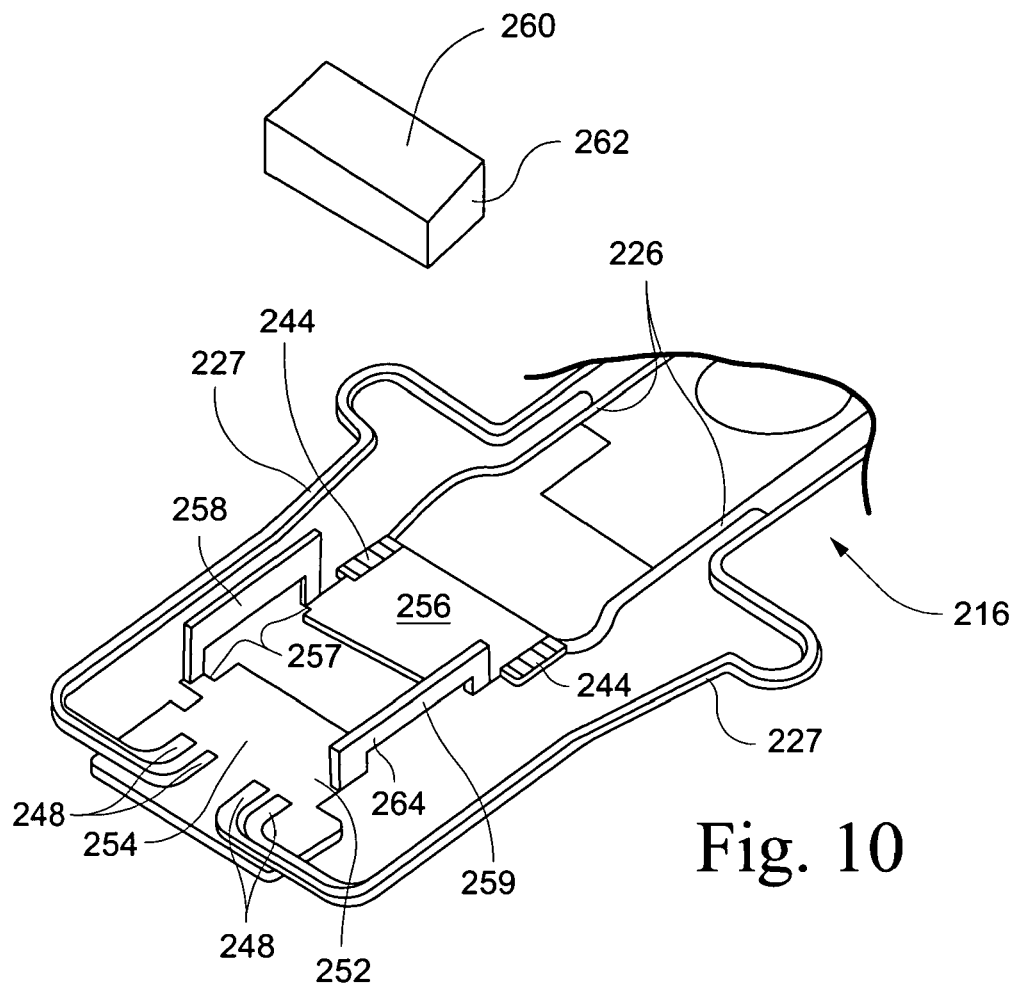
FIG. 10 a perspective view of the PZT micro-actuator shown in FIG. 4 with the block removed.
Figure 11:
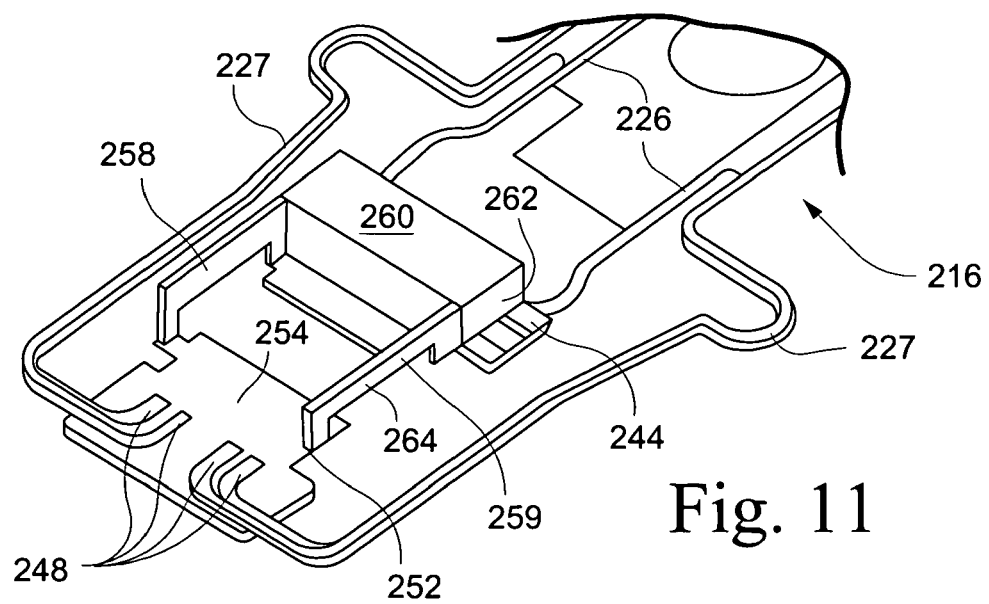
FIG. 11 a perspective view of the PZT micro-actuator shown in FIG. 4 with the block mounted.

As best shown in FIGS. 10 and 11, the PZT micro-actuator 212 includes a micro-actuator support frame 252, a block 260 mounted to the micro-actuator support frame 252, and PZT elements 242, 243 mounted to the micro-actuator support frame 252 and the block 260.

The micro-actuator support frame 252 is integrated or incorporated into the flexure 224. The micro-actuator support frame 252 includes a top support 254, a bottom support 256, and side arms 258, 259 that interconnect the top support 254 and the bottom support 256. The micro-actuator support frame 252 may be constructed of a relatively stiff material such as metal.

Bonding pads 244, are provided on the bottom support 256, e.g., two pads 256 on each side. The bonding pads 244 are directly connected to the inner suspension traces 226 to electrically connect the inner suspension traces 226 with bonding pads 246 provided on the PZT elements 242, 243, e.g., two bonding pads 246 on each PZT element 242, 243. Also, bonding pads 248 are provided on the top support 254, e.g., four bonding pads 248. The bonding pads 248 directly connected to the outer suspension traces 227 to electrically connect the outer suspension traces 227 with bonding pads 250 provided on the slider 214, e.g., four bonding pads 250.

Figure 14:
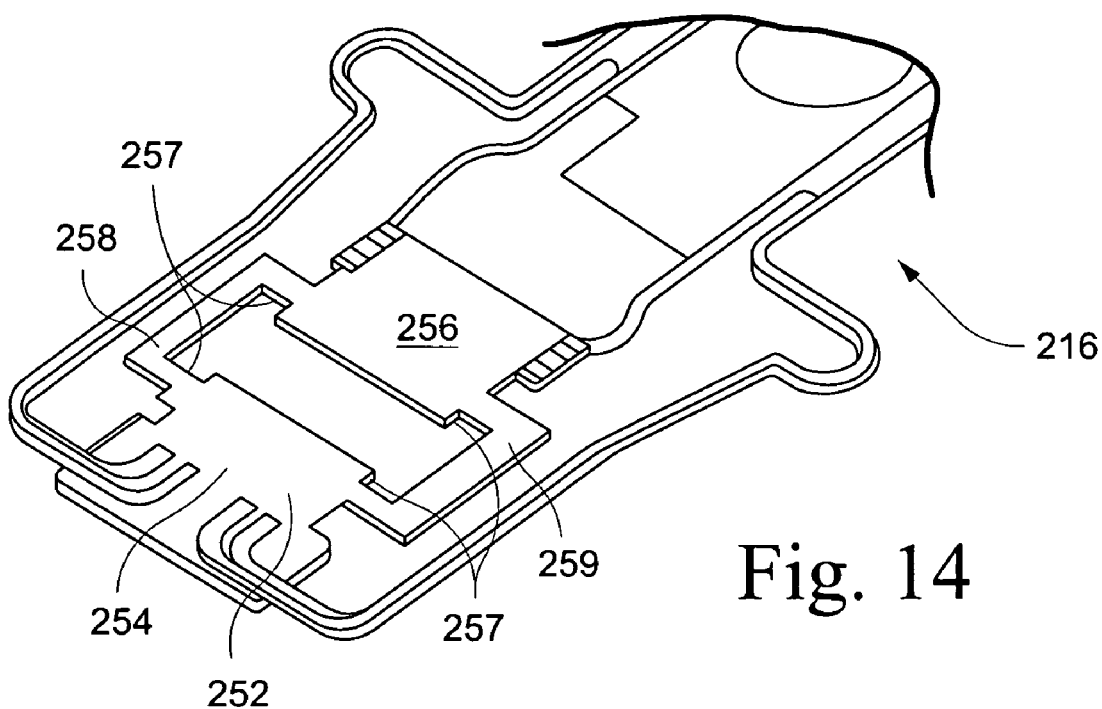
FIGS. 14-15 illustrate exemplary process for forming side arm of the PZT micro-actuator shown in FIG. 4.
Figure 15:
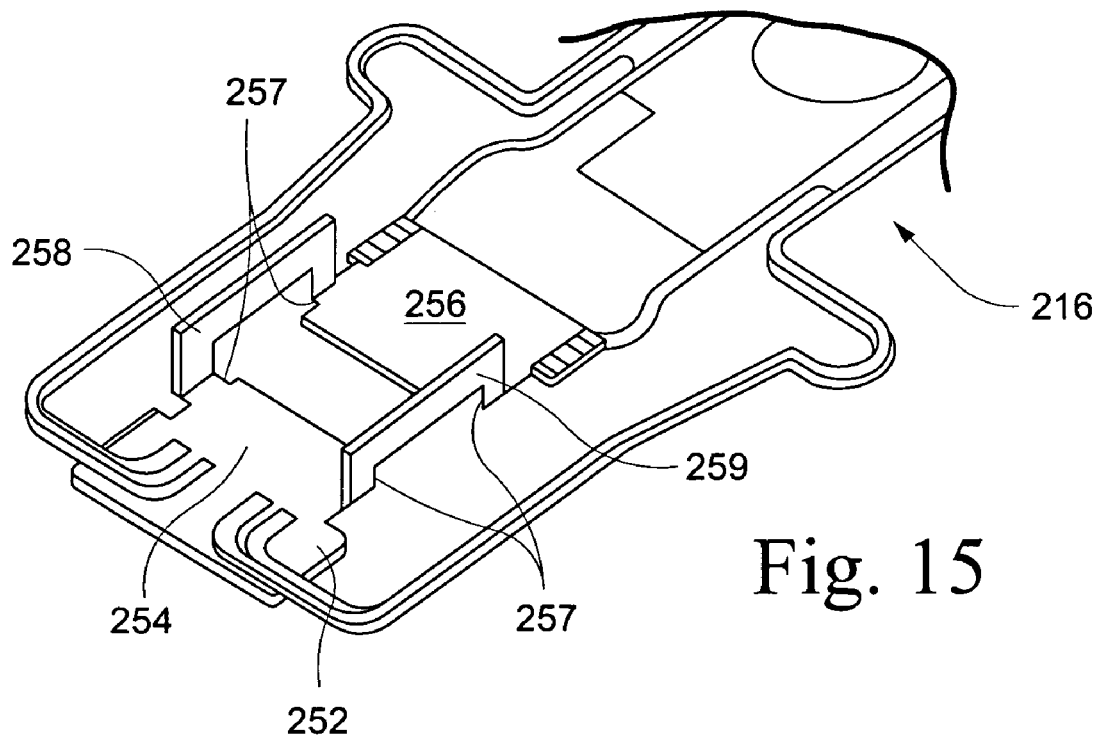
Figure 16:
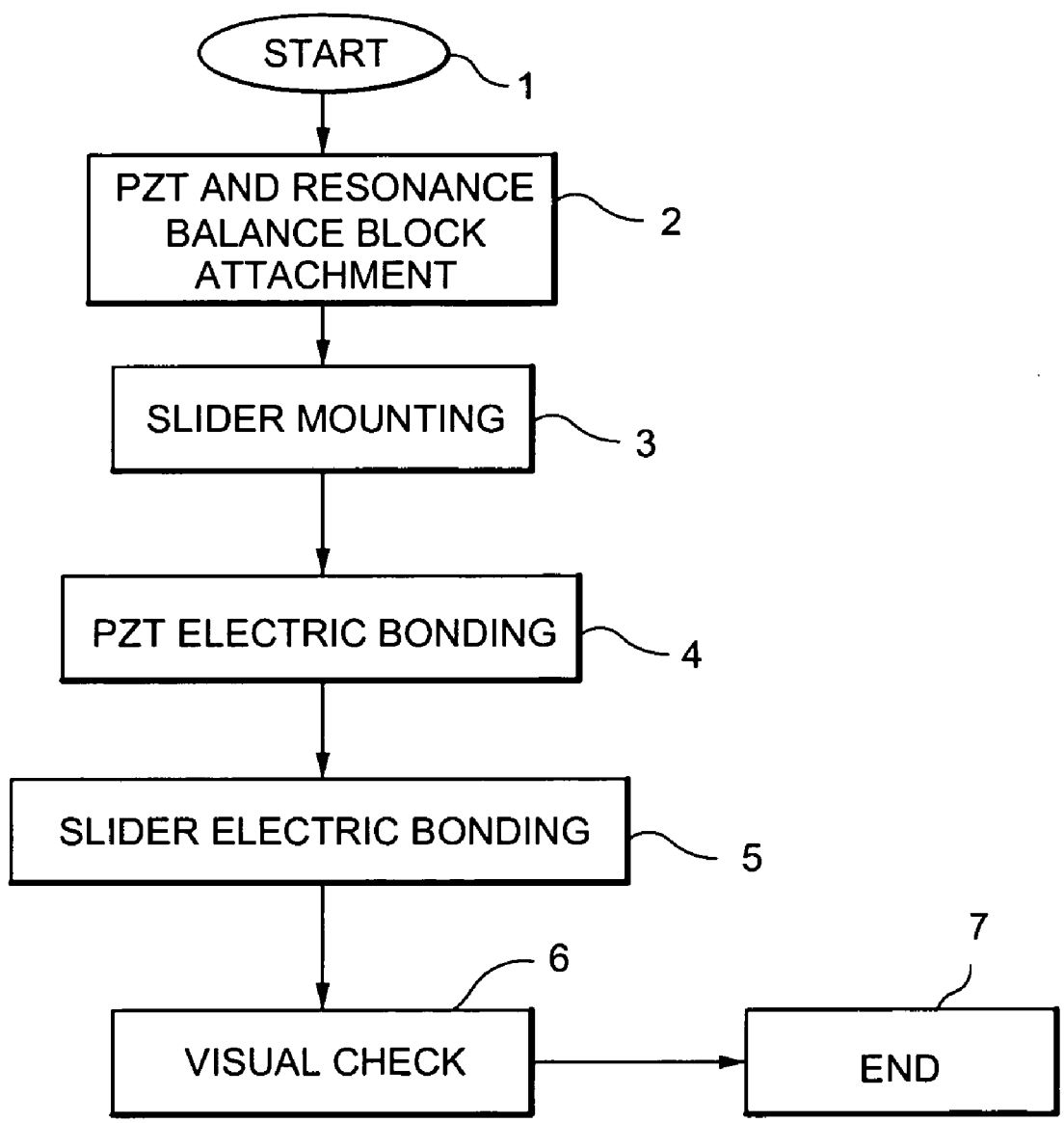
FIG. 16 is a flow chart illustrating a manufacturing and assembly process according to an embodiment of the present invention.

The side arms 258, 259 are vertically formed from opposing sides of the top and bottom supports 254, 256. In an embodiment, the side arms 258, 259 may be initially provided in a substantially flat condition as shown in FIG. 14, and then vertically formed into its operative position as shown in FIG. 15. As illustrated, inner notches or spaces 257, e.g., four notches, exist between the top and bottom supports 254, 256 and respective side arms 258, 259. This arrangement will allow the side arms 258, 259 more freedom of movement.

Figure 12:
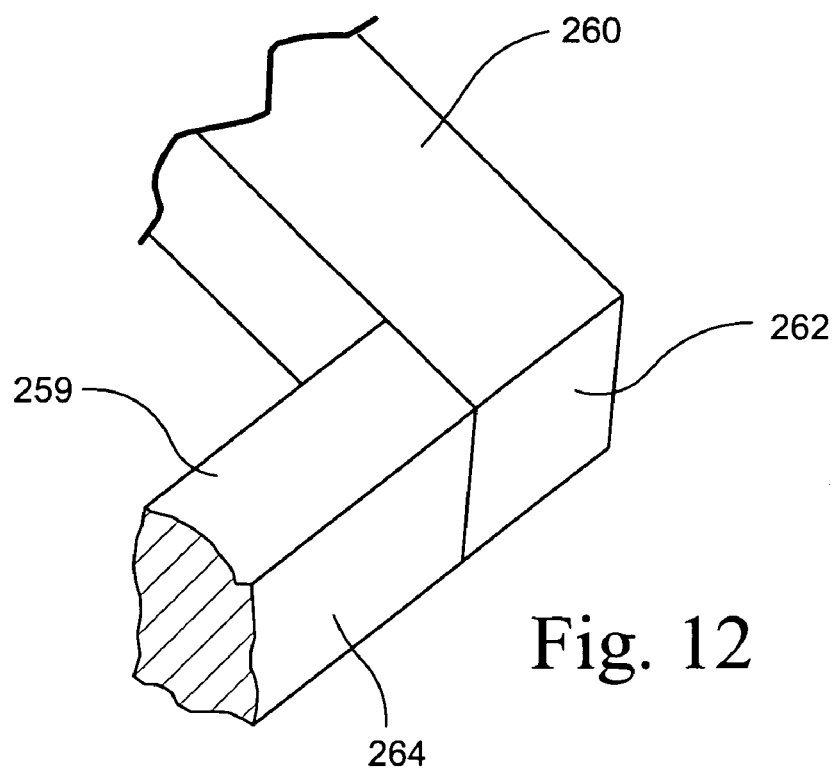
FIG. 12 is a partial perspective view illustrating the alignment between the block and side arm of the PZT micro-actuator shown in FIG. 4.

The block 260 is mounted, e.g., by welding, to the bottom support 256 of the micro-actuator support frame 252. The block 260 is used for resonance balance. As best shown in FIGS. 11 and 12, the block 260 is mounted to the bottom support 256 such that the side surfaces 262 of the block 260 are substantially aligned, level, and flush with outwardly facing surfaces 264 of respective side arms 258, 259. This arrangement facilitates mounting of the PZT elements 242, 243.

Figure 8:
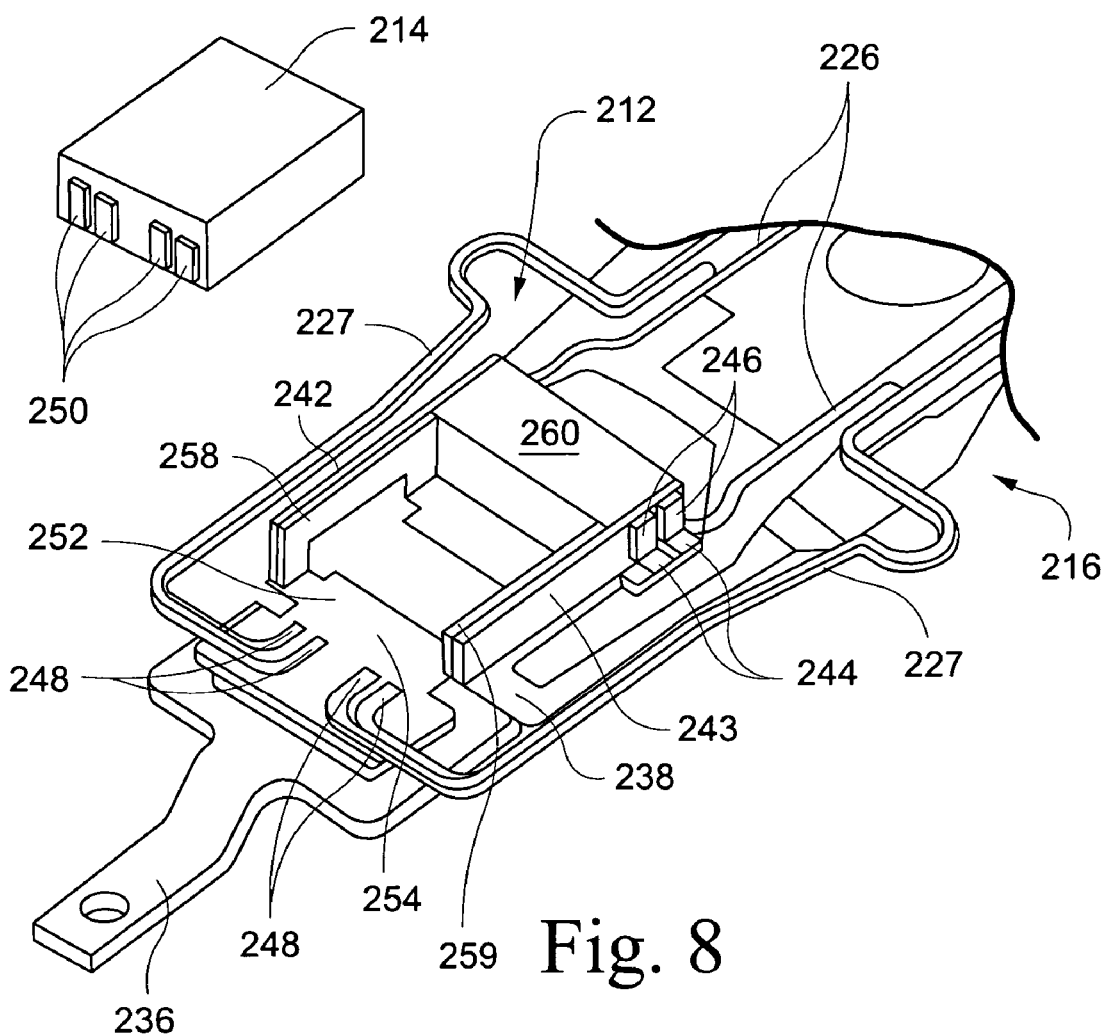
FIG. 8 a partial perspective view of the HGA shown in FIG. 4 with the slider removed from the PZT micro-actuator.
Figure 13:
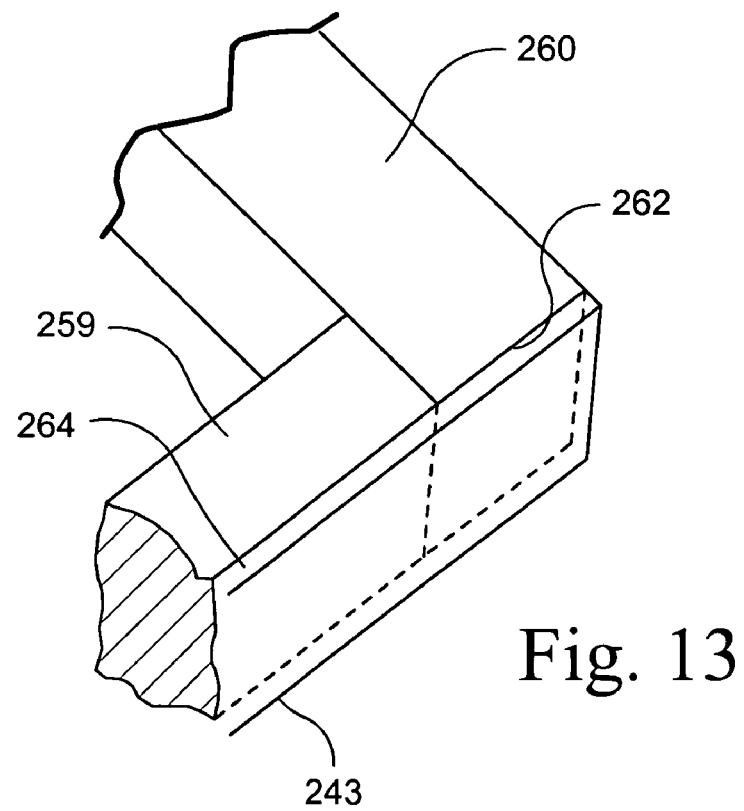
FIG. 13 is a partial perspective view illustrating the attachment of the PZT element to the block and side arm of the PZT micro-actuator shown in FIG. 4.

Each PZT elements 242, 243 is mounted to a respective side arm 258, 259 and to a respective side of the block 260. Specifically, as best shown in FIGS. 8 and 13, each PZT element 242, 243 is mounted to the outwardly facing surface 264 of a respective side arm 258, 259 and to a respective side surface 262 of the block 260. Bonding pads 246, e.g., two pads, are provided on each PZT element 242, 243 for electrically connecting each PZT element 242, 243 to bonding pads 244 directly connected to the inner suspension traces 226.

Figure 6:
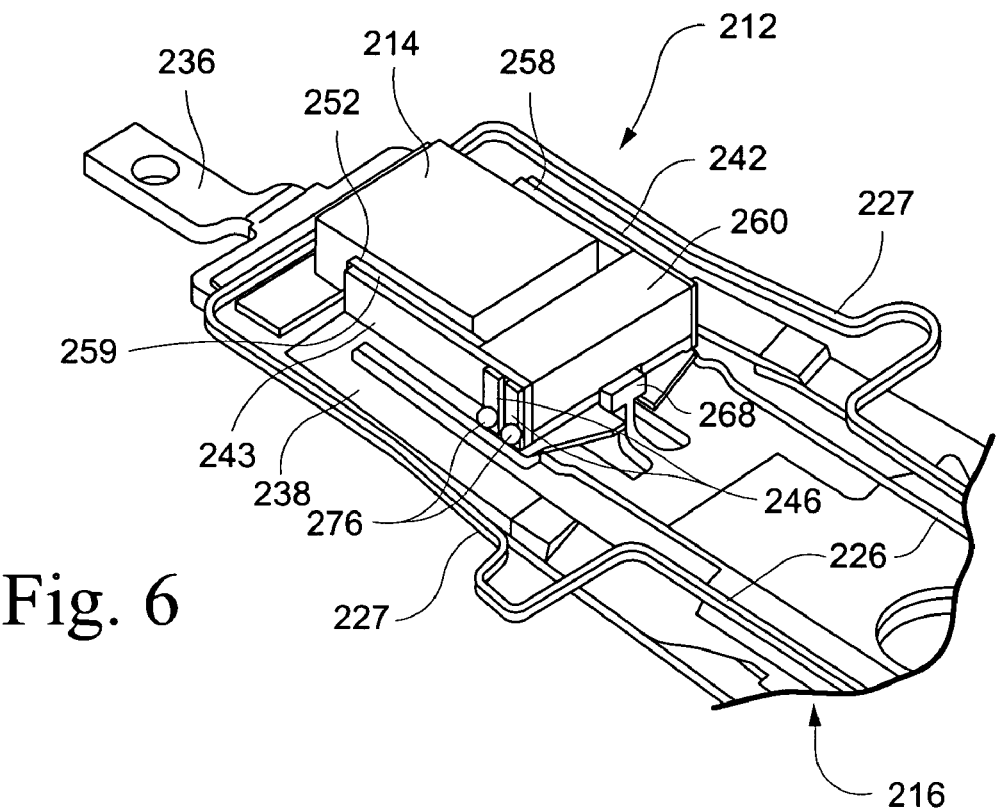
FIG. 6 is a partial rear perspective view of the HGA shown in FIG. 4.
Figure 9:
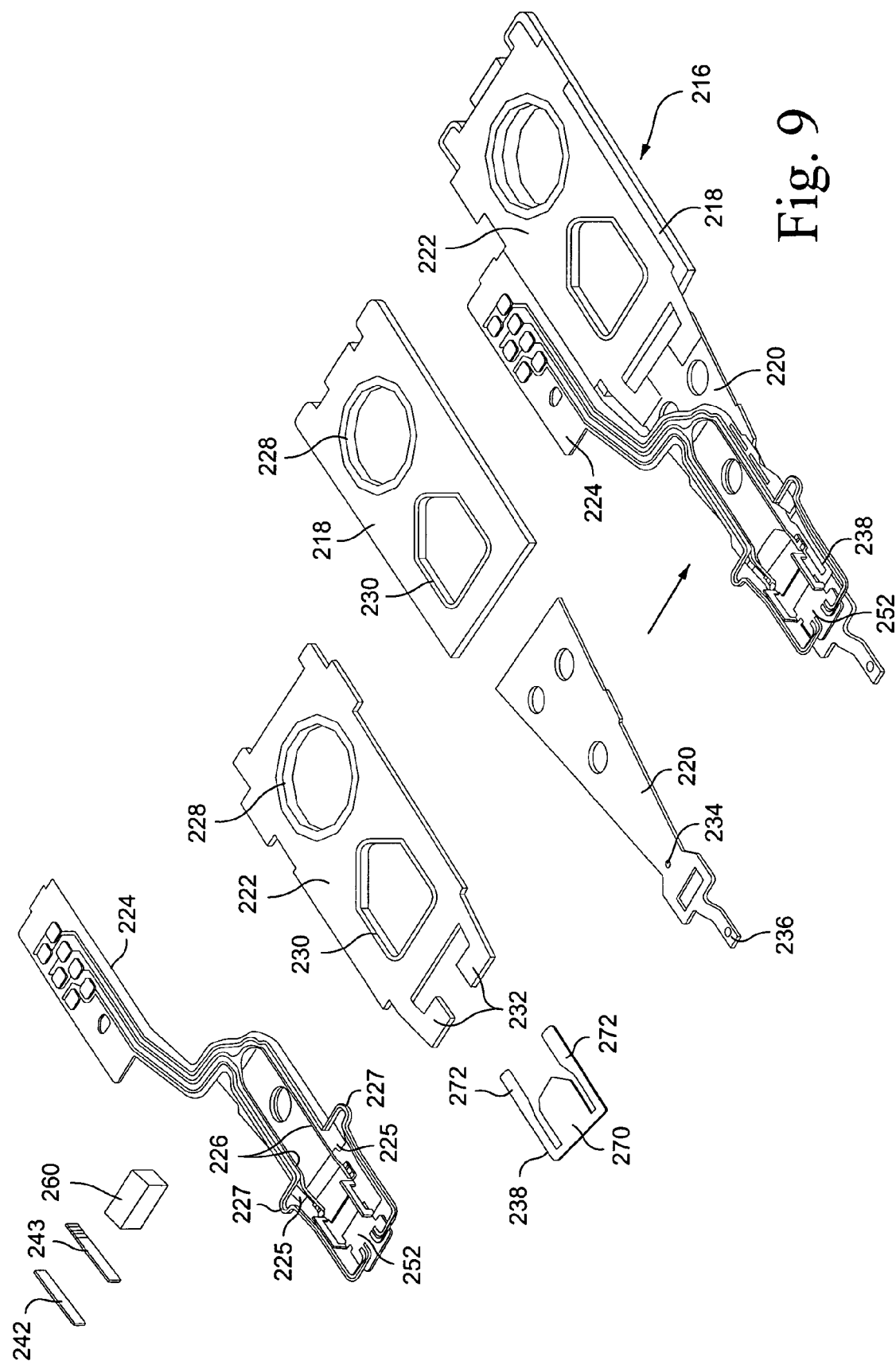
FIG. 9 is an exploded view of the HGA shown in FIG. 4.

As shown in FIG. 9, the suspension tongue 238 is formed separately from the flexure 224 and includes a middle region 270 and two arm members 272. The suspension tongue 238 is mounted to the flexure 224 by attaching the two arm members 272 to respective side regions 225 provided on the flexure 224, e.g., by laser welding. As shown in FIG. 6, a limiter 268 is provided on the load beam 220 to limit movement of the suspension tongue 238.

Figure 7:
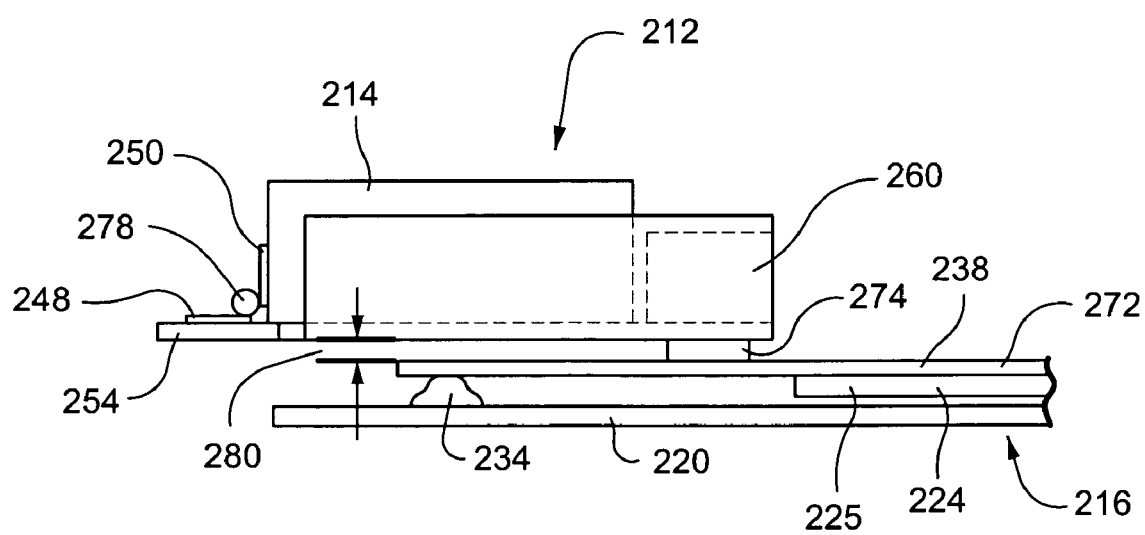
FIG. 7 is a partial side view of the HGA shown in FIG. 4.

As shown in FIGS. 7-8, the bottom support 256 is mounted to the suspension tongue 238. In the illustrated embodiment, the bottom support 256 is mounted to the suspension tongue 238 by epoxy 274. However, the bottom support 256 may be mounted to the suspension tongue 238 in other suitable manners, e.g., by ACF or laser welding.

Also, the PZT bonding pads 246, e.g., two bonding pads, provided on respective PZT elements 242, 243 are electrically connected to respective bonding pads 244 on the bottom support 256 using electrical connection balls (GBB or SBB) 276. This allows power to be applied via the inner suspension traces 226 to the PZT elements 242, 243.

The top support 254 is structured to connect the micro-actuator support frame 252 to the slider 214. Specifically, the slider 214 has bonding pads 250, e.g., four bonding pads, on an end thereof corresponding to the slider bonding pads 248 provided on the top support 254. The top support 254 supports the slider 214 thereon and the slider bonding pads 248 are electrically bonded with respective pads 250 provided on the slider 214 using, for example, electric connection balls (GBB or SBB) 278. This connects the top support 254 to the slider 214 and electrically connects the slider 214 and its read/write elements to the outer suspension traces 227.

As shown in FIG. 7, the micro-actuator support frame 252 is mounted to the suspension tongue 238 with a parallel gap 280. This arrangement allows the micro-actuator support frame 252 to move smoothly and freely in use.

Also, one end of the suspension tongue 238 is supported by the dimple 234 on the load beam 220 positioned under the center of the slider 214, and the opposite end of the suspension tongue 238 is mounted, e.g., by welding, to side regions 225 provided on the flexure 224. This arrangement maintains a mechanical step and supports the suspension tongue 238 in parallel relation with respect to the load beam 220, which allows the suspension 216 to maintain a good static attitude.

Figure 17A:
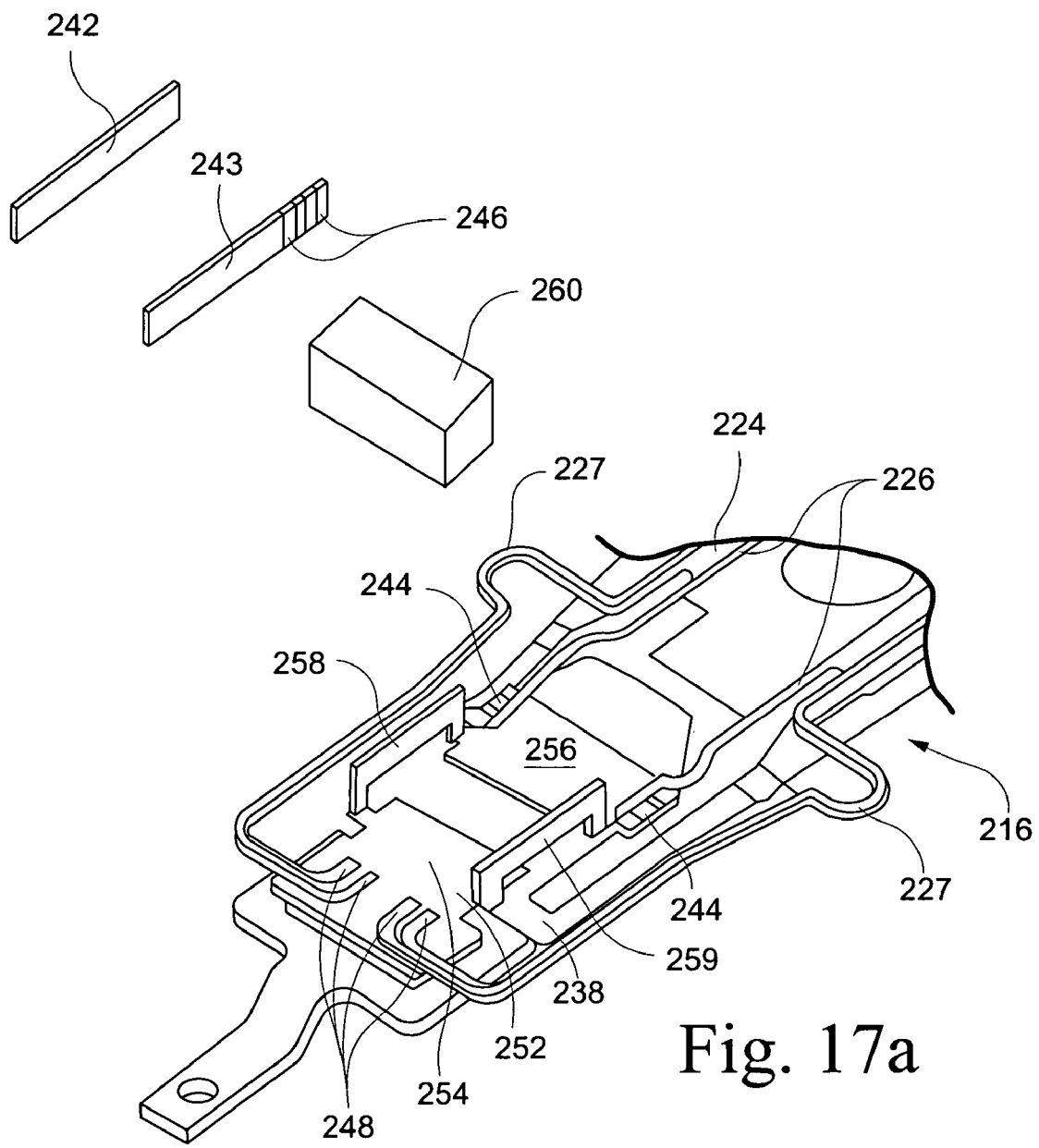
FIGS. 17a-17c are sequential views illustrating the manufacturing and assembly process shown in FIG. 16.
Figure 17B:
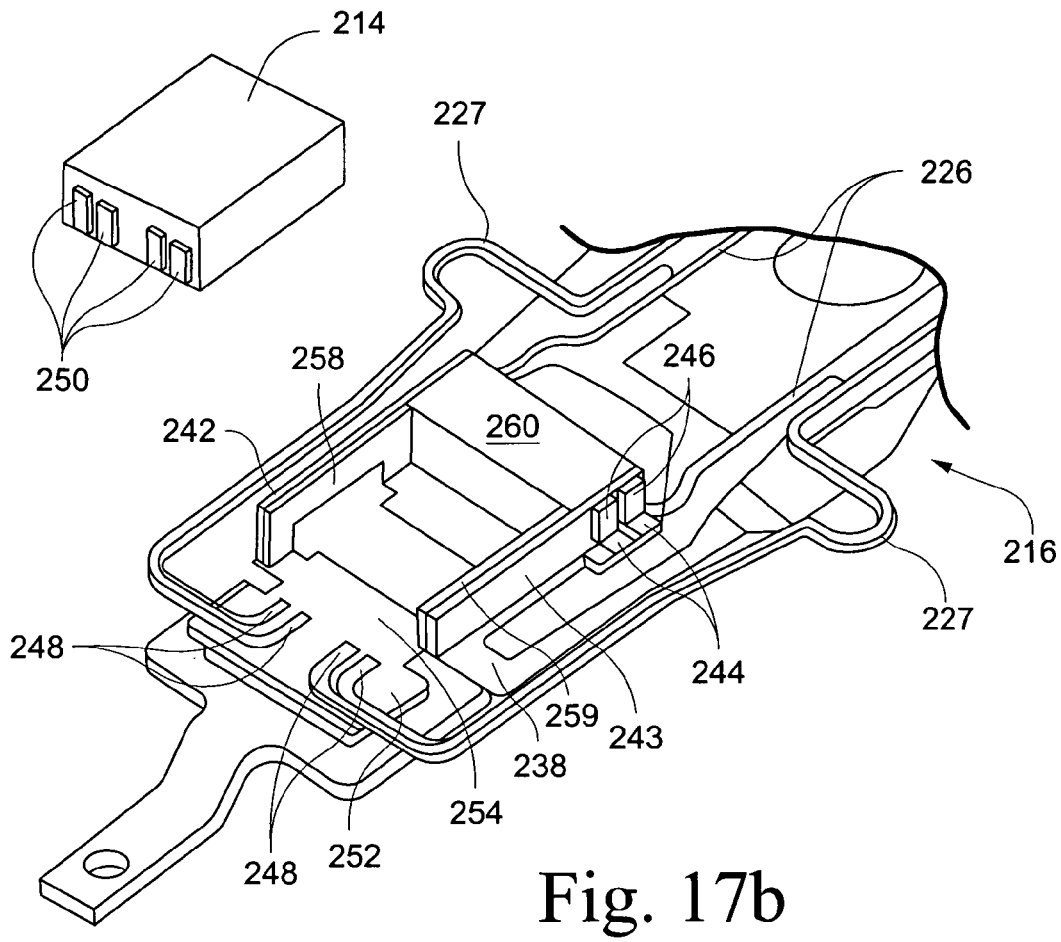
Figure 17C:
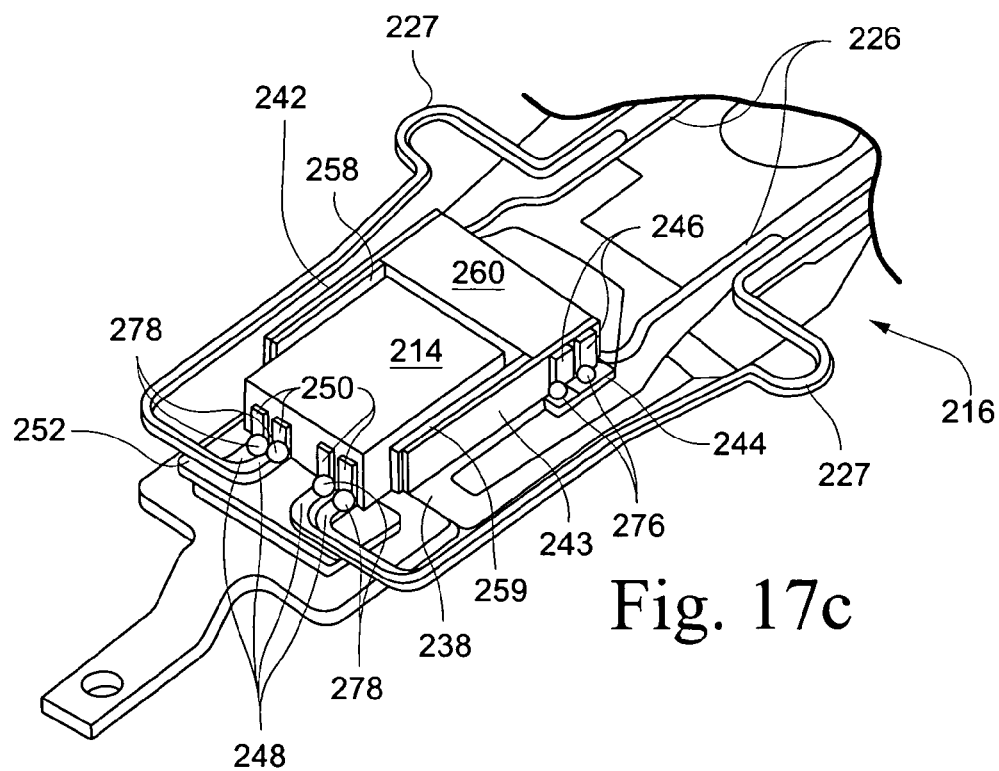

FIGS. 16 and 17a-17c illustrate the primary steps involved in the manufacturing and assembly process of the PZT micro-actuator 212 according to an embodiment of the present invention. After the process starts (step 1 in FIG. 16), PZT elements 242, 243 and a resonance balance block 260 are attached to the micro-actuator support frame 252 integrated with the suspension flexure 224 (step 2 in FIG. 16), as shown in FIG. 17a. Next, as shown in FIG. 17b, a slider 214 is mounted to the micro-actuator support frame 252 (step 3 in FIG. 16). Then, as shown in FIG. 17c, the PZT elements 242, 243 are electrically bonded with suspension traces 226 (step 4 in FIG. 16), and the slider 214 is electrically bonded with suspension traces 227 (step 5 in FIG. 16). A visual check is performed (step 6 in FIG. 16) to complete the manufacturing and assembly process (step 7 in FIG. 16).

Figure 18:
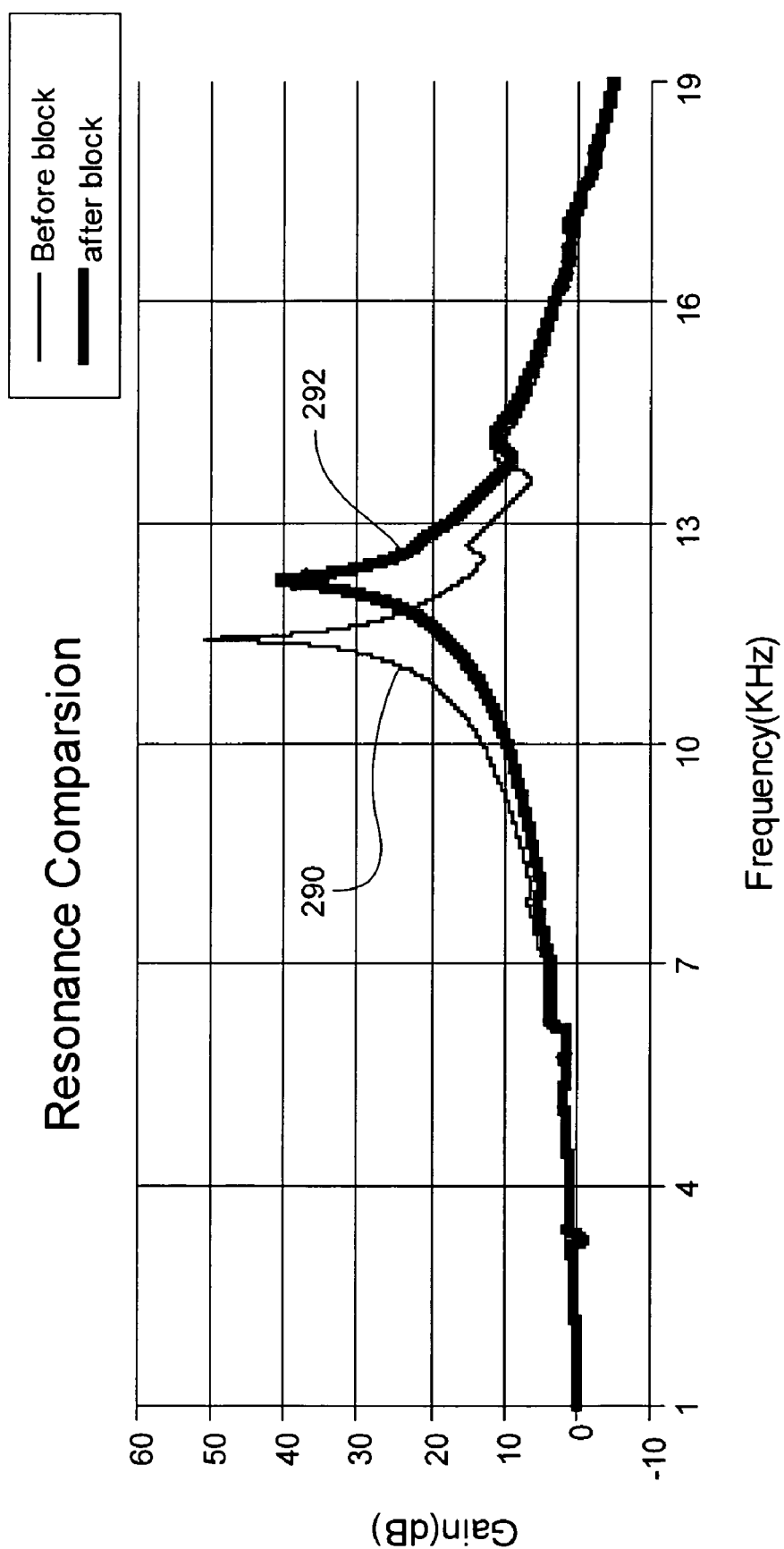
FIG. 18 shows testing data of the resonance of the PZT micro-actuator shown in FIG. 4.

FIG. 18 illustrates resonance testing data before and after the block 260 is mounted to the micro-actuator support frame 252. Specifically, the curve 290 illustrates resonance before the block 260 is mounted, and the curve 292 illustrates resonance after the block 260 is mounted. As illustrated, both the resonance frequency and gain are improved after the block 260 is mounted to the micro-actuator support frame 252.

Figure 19:
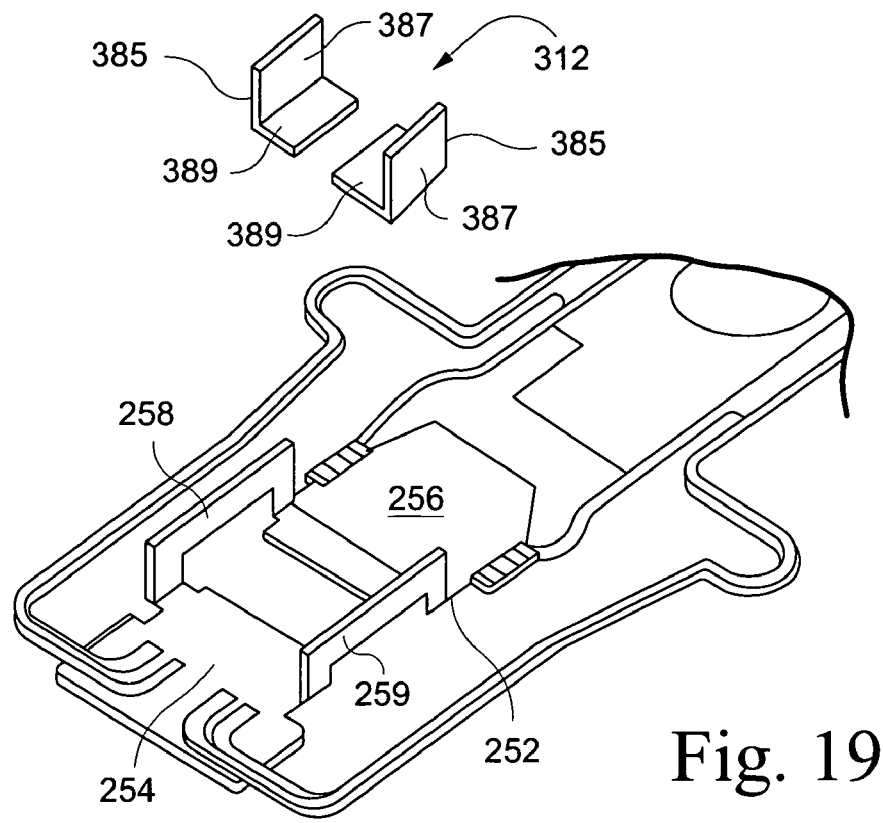
FIGS. 19-20 are perspective views of a PZT micro-actuator according to another embodiment of the present invention.
Figure 20:
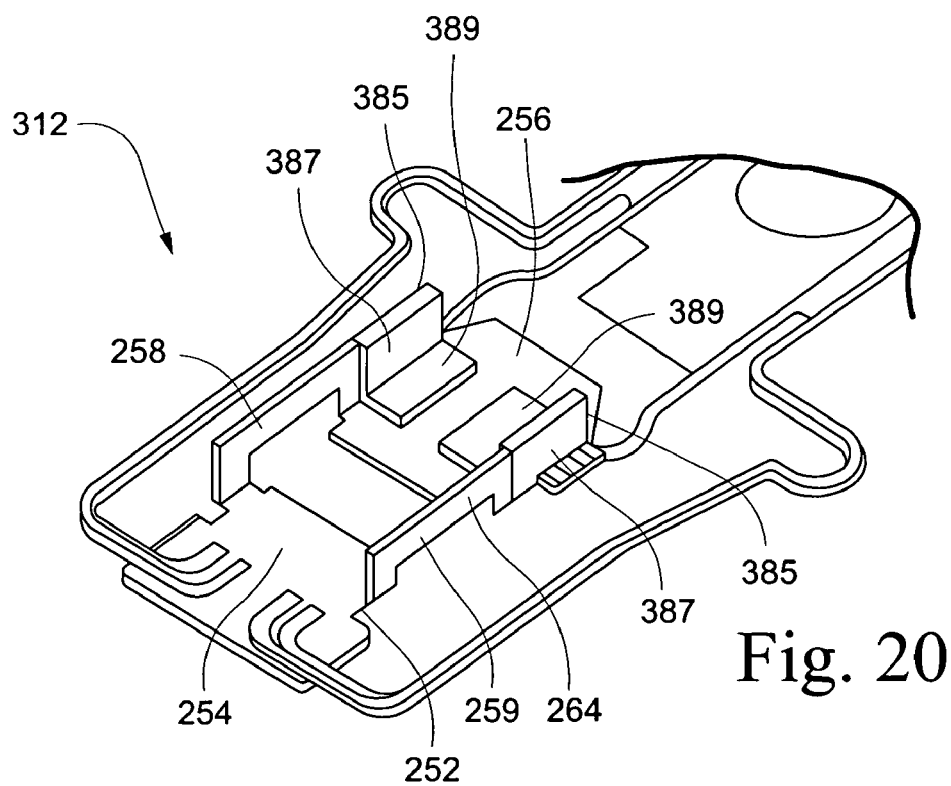

FIGS. 19-20 illustrate a PZT micro-actuator 312 according to another embodiment of the present invention. In this embodiment, resonance balance is provided by two separate parts 385. Each part 385 includes first and second arms 387, 389 that are bent 90° with respect to one another. As shown in FIG. 20, the parts 385 are mounted to the bottom support 256 of the micro-actuator support frame 252 such that the arms 387 of the parts 385 are substantially aligned with outwardly facing surfaces 264 of respective side arms 258, 259. The remaining components of the PZT micro-actuator 312 are substantially similar to the PZT micro-actuator 212 and indicated with similar reference numerals.

FIGS. 21-22 illustrate a PZT micro-actuator 412 according to another embodiment of the present invention. In this embodiment, resonance balance is provided by part 485. The part 485 includes a bottom arm 486 and first and second side arms 487, 489 that are bent 90° with respect to the bottom arm 486. As shown in FIG. 22, the part 485 is mounted to the bottom support 256 of the micro-actuator support frame 252 such that the arms 487, 489 of the part 485 are substantially aligned with outwardly facing surfaces 264 of respective side arms 258, 259. The remaining components of the PZT micro-actuator 412 are substantially similar to the PZT micro-actuator 212 and indicated with similar reference numerals.

Figure 2:
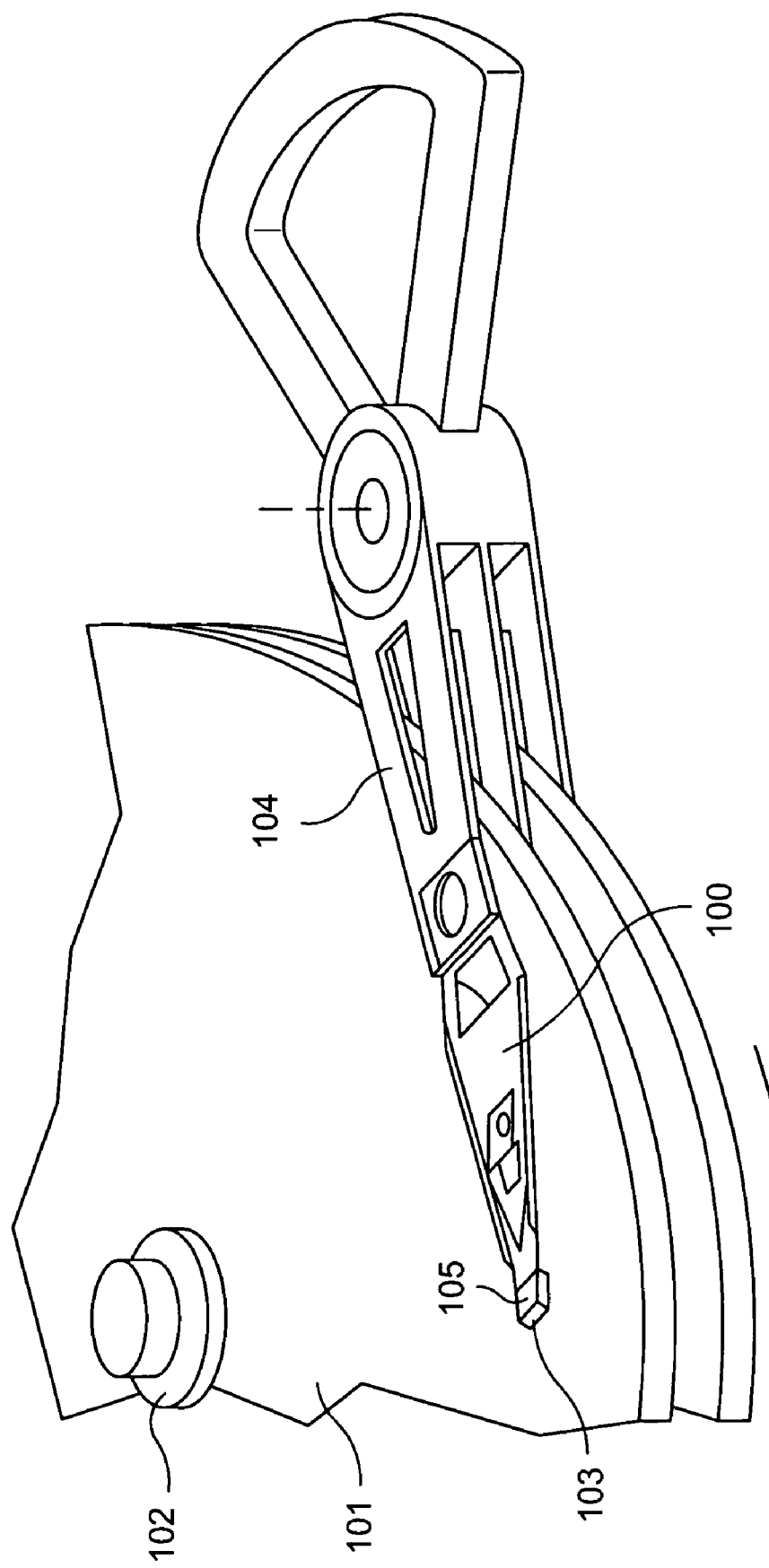
FIG. 2 is a partial perspective view of the conventional disk drive unit shown in FIG. 1.
Figure 3:
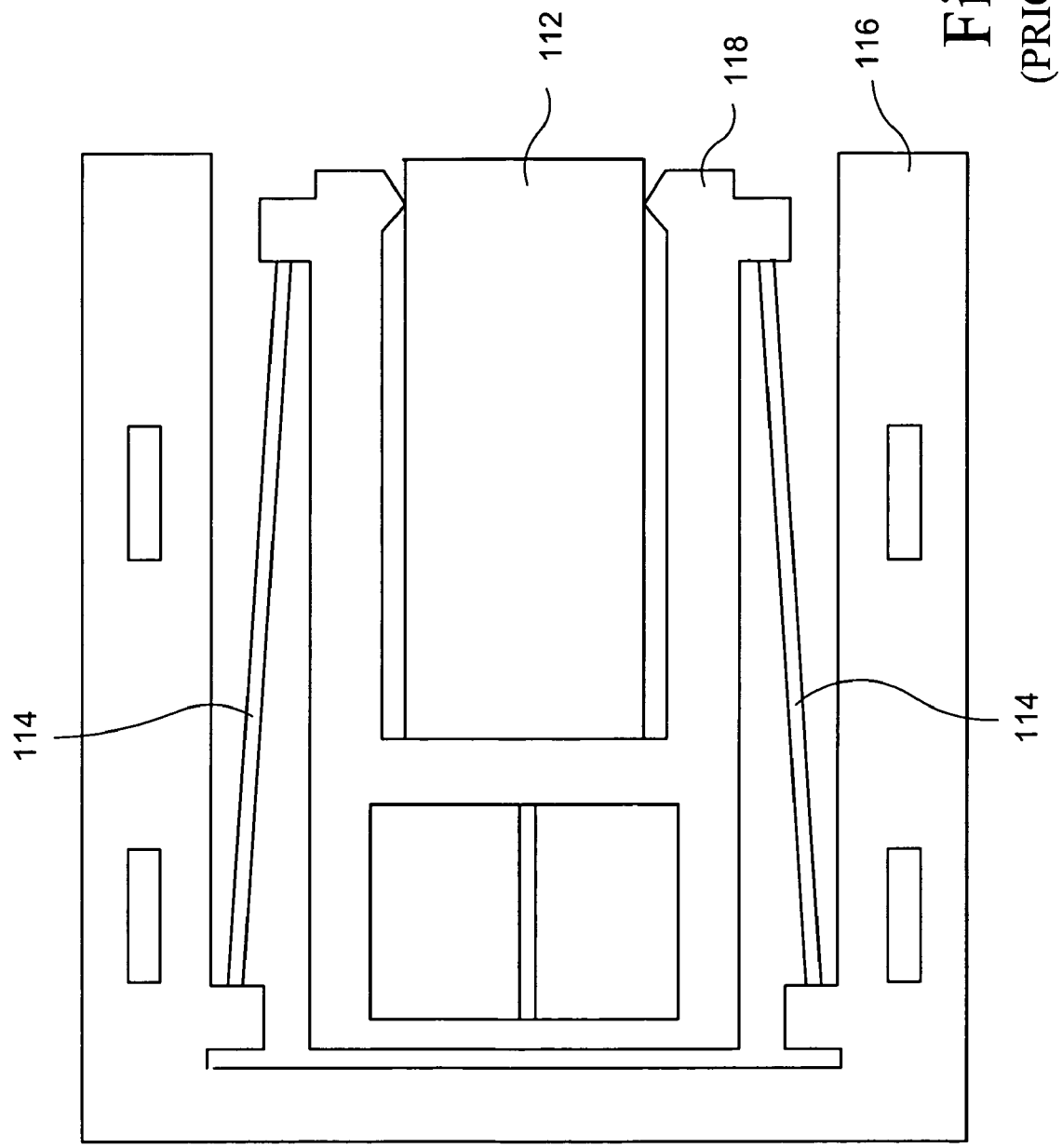
FIG. 3 is a plan view of a prior art micro-actuator.
Figure 4:
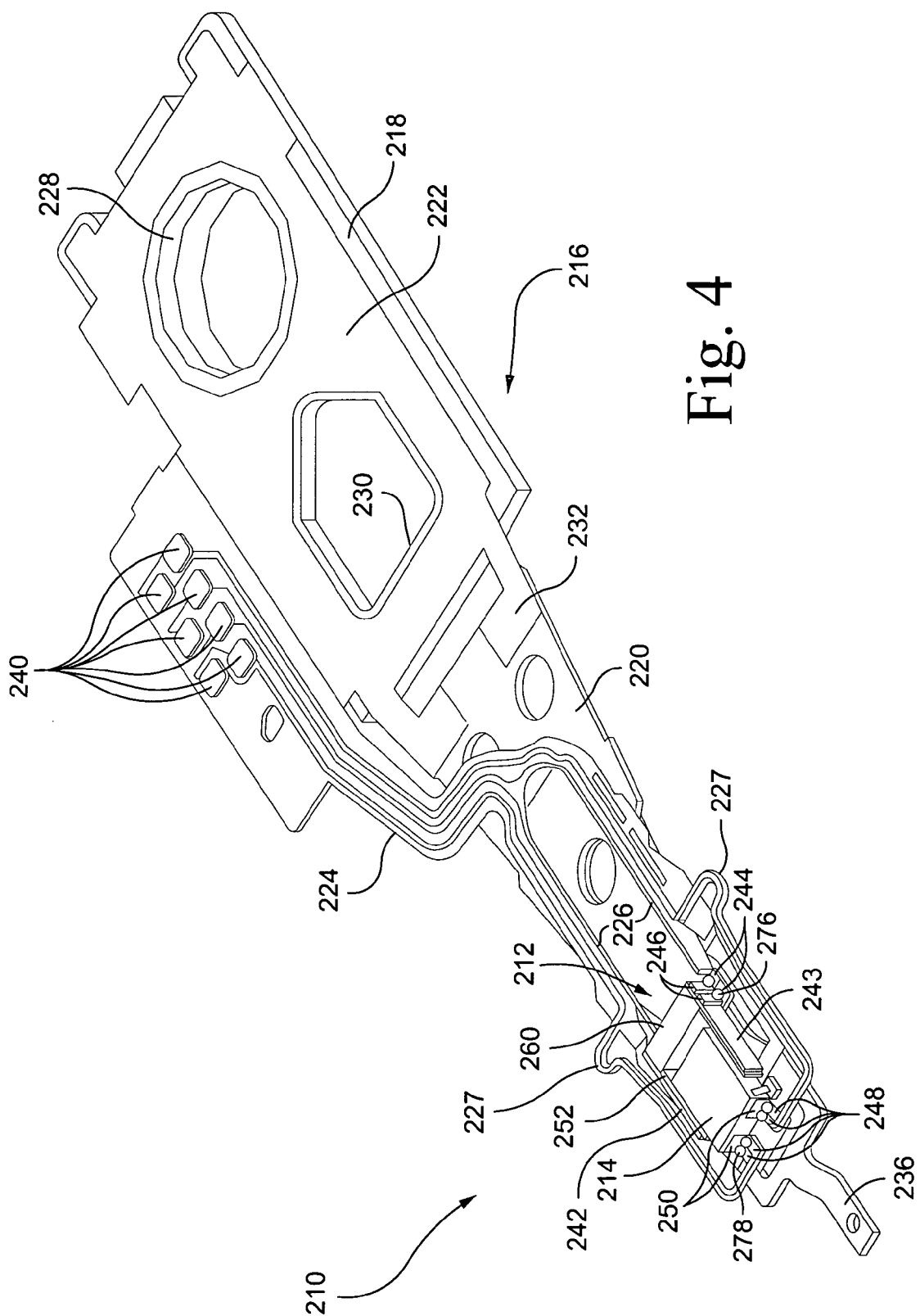
FIG. 4 is a perspective view of a head gimbal assembly (HGA) including a PZT micro-actuator according to an embodiment of the present invention.
Figure 5:
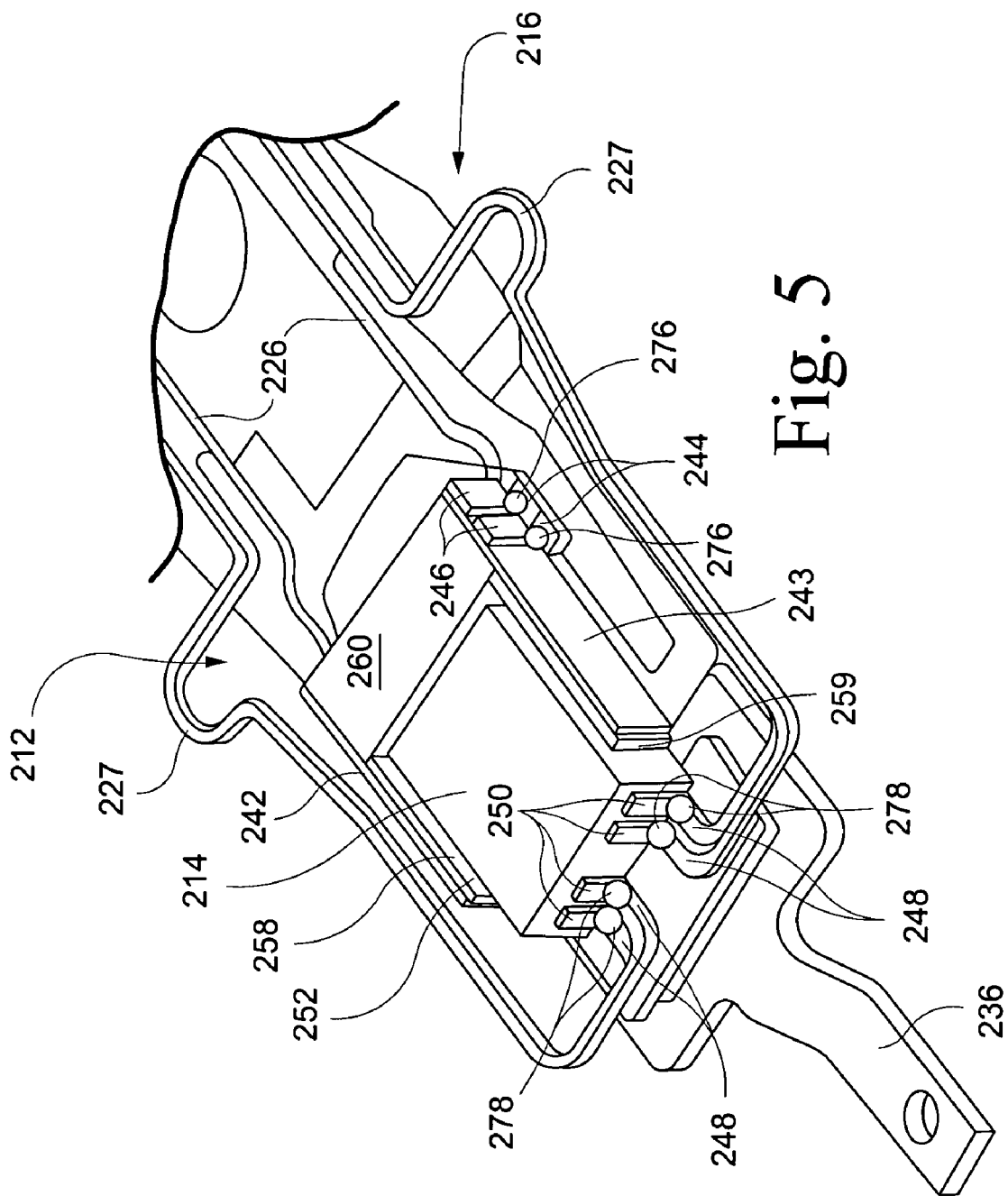
FIG. 5 is a partial front perspective view of the HGA shown in FIG. 4.

A head gimbal assembly 210 incorporating a PZT micro-actuator 212, 312, 412, according to embodiments of the present invention may be provided to a disk drive device (HDD). The HDD may be of the type described above in connection with FIGS. 1 and 2. Because the structure, operation and assembly processes of disk drive devices are well known to persons of ordinary skill in the art, further details regarding the disk drive device are not provided herein so as not to obscure the invention. The PZT micro-actuator can be implemented in any suitable disk drive device having a micro-actuator or any other device with a micro-actuator.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A micro-actuator for a head gimbal assembly, comprising:
    a support frame integrated with a suspension flexure of the head gimbal assembly, the support frame including
        a bottom support,
        a top support adapted to support a slider of the head gimbal assembly, and
        a pair of side arms that interconnect the bottom support and the top support,
        the side arms extending vertically from respective sides of the bottom support and the top support;
    a block mounted to the bottom support to provide resonance balance; and
    a pair of PZT elements, each PZT element mounted to a respective side arm of the support frame and a respective side of the block, wherein the PZT elements are excitable to cause selective movement of the side arms.

2. The micro-actuator according to claim 1, wherein the support frame is constructed of metal.

3. The micro-actuator according to claim 1, wherein the bottom support includes bonding pads connected to suspension traces of the suspension flexure, the bonding pads being electrically bonded with respective bonding pads provided on the PZT elements.

4. The micro-actuator according to claim 1, wherein the top support includes bonding pads connected to suspension traces of the suspension flexure, the bonding pads being electrically bonded with respective bonding pads provided on the slider.

5. The micro-actuator according to claim 1, wherein the block includes side surfaces that are aligned with outwardly facing surfaces of respective side arms.

6. A head gimbal assembly comprising:
    a micro-actuator;
    a slider; and
    a suspension that supports the micro-actuator and the slider,
    wherein the micro-actuator includes:
    a support frame integrated with a suspension flexure of the suspension, the support frame including
        a bottom support,
        a top support to support the slider, and
        a pair of side arms that interconnect the bottom support and the top support,
        the side arms extending vertically from respective sides of the bottom support and the top support;
    a block mounted to the bottom support to provide resonance balance; and
    a pair of PZT elements, each PZT element mounted to a respective side arm of the support frame and a respective side of the block, wherein the PZT elements are excitable to cause selective movement of the side arms.

7. The head gimbal assembly according to claim 6, wherein the bottom support is mounted to a suspension tongue of the suspension.

8. The head gimbal assembly according to claim 7, wherein the suspension tongue includes a middle region and two arm members, the two arm members mounted to respective side regions of the suspension flexure.

9. The head gimbal assembly according to claim 7, wherein the bottom support is mounted to the suspension tongue by epoxy, ACF, or laser welding.

10. The head gimbal assembly according to claim 7, wherein the suspension tongue is supported by a dimple on a load beam of the suspension and side regions of the suspension flexure.

11. The head gimbal assembly according to claim 7, wherein the suspension tongue maintains a step to support the micro-actuator.

12. The head gimbal assembly according to claim 6, wherein the support frame is constructed of metal.

13. The head gimbal assembly according to claim 6, wherein the bottom support includes bonding pads connected to suspension traces of the suspension flexure, the bonding pads being electrically bonded with respective bonding pads provided on the PZT elements.

14. The head gimbal assembly according to claim 6, wherein the top support includes bonding pads connected to suspension traces of the suspension flexure, the bonding pads being electrically bonded with respective bonding pads provided on the slider.

15. The head gimbal assembly according to claim 6, wherein the block includes side surfaces that are aligned with outwardly facing surfaces of respective side arms.

16. A disk drive device comprising:
   a head gimbal assembly including a micro-actuator, a slider, and a suspension that supports the micro-actuator and slider;
   a drive arm connected to the head gimbal assembly;
   a disk; and
   a spindle motor operable to spin the disk,
   wherein the micro-actuator includes:
   a support frame integrated with a suspension flexure of the suspension, the support frame including
      a bottom support,
      a top support to support the slider, and
      a pair of side arms that interconnect the bottom support and the top support,
      the side arms extending vertically from respective sides of the bottom support and the top support;
   a block mounted to the bottom support to provide resonance balance; and
   a pair of PZT elements, each PZT element mounted to a respective side arm of the support frame and a respective side of the block, wherein the PZT elements are excitable to cause selective movement of the side arms.

17. A method for manufacturing a PZT micro-actuator, the method comprising:
   integrating a micro-actuator support frame with a suspension flexure of a suspension;
   attaching a resonance balance block to a bottom support of the micro-actuator support frame;
   attaching PZT elements to the micro-actuator support frame such that each PZT element extends along a respective side arm of the micro-actuator support frame and a respective side of the resonance balance block;
   mounting a slider to a top support of the micro-actuator support frame;
   electrically bonding the PZT elements and the slider with suspension traces of the suspension; and
   performing a visual check.

18. The method according to claim 17, further comprising:
   mounting a suspension tongue to the suspension flexure; and
   mounting the bottom support of the micro-actuator support frame to the suspension tongue.

19. The method according to claim 18, wherein the suspension tongue is supported by a dimple on a load beam of the suspension.

20. The method according to claim 18, wherein mounting a suspension tongue includes mounting two arms members of the suspension tongue to respective side regions of the suspension flexure.

\* \* \* \* \*